United States Patent
Choi et al.

(10) Patent No.: US 12,246,517 B2
(45) Date of Patent: Mar. 11, 2025

(54) REAL WOOD SHEET CAPABLE OF BEING USED FOR AUTOMATIC WRAPPING AND METHOD OF MANUFACTURING REAL WOOD SHEET

(71) Applicants: HYUNDAI MOBIS Co., Ltd., Seoul (KR); SEOYON AUTOVISION Co., Ltd., Dangjin-si (KR)

(72) Inventors: Ik Keun Choi, Yongin-si (KR); Min Kyeong Lee, Yongin-si (KR); Hyun Ho Lee, Gunpo-si (KR); Ji Seung Hong, Hwaseong-si (KR); Jong Jin Lee, Incheon (KR)

(73) Assignees: Hyundai Mobis Co., Ltd., Seoul (KR); SEOYON AUTOVISION Co., Ltd., Dangjin-si (KR)

( * ) Notice: Subject to any disclaimer, the term of this patent is extended or adjusted under 35 U.S.C. 154(b) by 0 days.

(21) Appl. No.: 17/840,925

(22) Filed: Jun. 15, 2022

(65) Prior Publication Data
US 2023/0043256 A1  Feb. 9, 2023

(30) Foreign Application Priority Data
Aug. 4, 2021  (KR) .................. 10-2021-0102387

(51) Int. Cl.
*B32B 21/14*  (2006.01)
*B32B 5/02*  (2006.01)
(Continued)

(52) U.S. Cl.
CPC .............. *B32B 21/14* (2013.01); *B32B 5/02* (2013.01); *B32B 5/18* (2013.01); *B32B 7/12* (2013.01); *B32B 9/042* (2013.01); *B32B 9/046* (2013.01); *B32B 21/10* (2013.01); *B32B 2266/0292* (2013.01); *B32B 2605/003* (2013.01)

(58) Field of Classification Search
CPC .......... B32B 7/12; B32B 9/042; B32B 9/046; B32B 21/04; B32B 21/047; B32B 21/08; B32B 21/10; B32B 21/14; B32B 2266/0292; B32B 2605/003;
(Continued)

(56) References Cited

U.S. PATENT DOCUMENTS 3,423,276 A * 1/1969 Eckenroth ................ B44C 5/04
                                                    428/80
4,429,012 A   1/1984 Danko
(Continued)

FOREIGN PATENT DOCUMENTS

CN  1717320 A   1/2006
CN  104723632 A  6/2015
(Continued)

OTHER PUBLICATIONS

Translation of JP2000280206A. (Year: 2000).*
Wang Huijun, "Automobile Styling Design [M]" National Defense Industry Press, Jan. 31, 2007, pp. 184-187.

*Primary Examiner* — Catherine A. Simone
(74) *Attorney, Agent, or Firm* — NSIP Law

(57) ABSTRACT

A real wood sheet capable of being used for automatic wrapping, the real wood sheet including a wood layer; a mesh layer disposed on a surface of the wood layer; and a flexible layer disposed on a surface of the mesh layer such that the mesh layer is disposed between the wood layer and the flexible layer.

9 Claims, 4 Drawing Sheets

(51) Int. Cl.
   *B32B 5/18*       (2006.01)
   *B32B 7/12*       (2006.01)
   *B32B 9/04*       (2006.01)
   *B32B 21/10*      (2006.01)

(58) Field of Classification Search
   CPC ..... B60R 13/0256; B60R 13/02; B60R 21/04;
                              B60R 21/205
   See application file for complete search history.

(56) References Cited

U.S. PATENT DOCUMENTS

| | | |
|---|---|---|
| 5,626,382 A | 5/1997 | Johnson et al. |
| 2015/0174853 A1 | 6/2015 | Jeon |
| 2016/0311194 A1* | 10/2016 | Brown ................ B32B 37/1207 |
| 2017/0029989 A1 | 2/2017 | Tuscia et al. |

FOREIGN PATENT DOCUMENTS

| | | | | |
|---|---|---|---|---|
| CN | 110562314 A | | 12/2019 | |
| EP | 0 673 763 A1 | | 9/1995 | |
| JP | 5-24140 A | | 2/1993 | |
| JP | 2000280206 A | * | 10/2000 | ............... B27D 5/00 |
| KR | 20-0367257 Y1 | | 11/2004 | |
| KR | 10-2019-0035236 A | | 4/2019 | |
| KR | 10-2020-0042116 A | | 4/2020 | |
| WO | WO 2012/120120 A1 | | 9/2012 | |

* cited by examiner

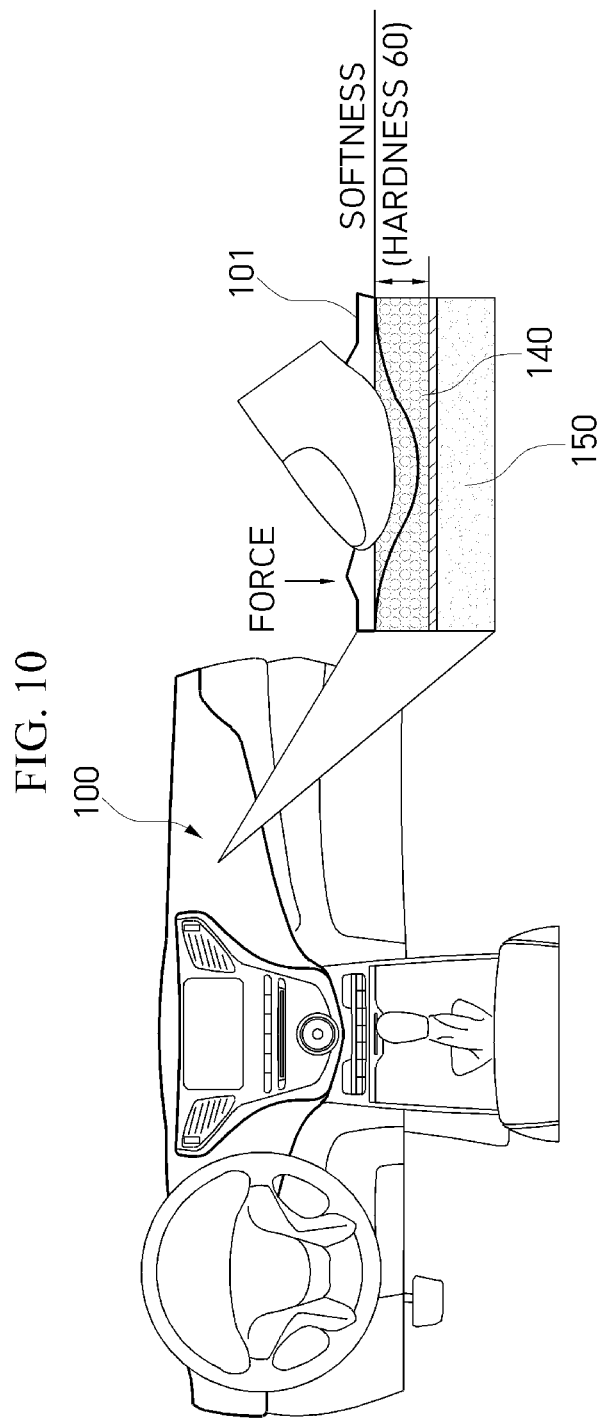

REAL WOOD SHEET CAPABLE OF BEING USED FOR AUTOMATIC WRAPPING AND METHOD OF MANUFACTURING REAL WOOD SHEET

CROSS-REFERENCE TO RELATED APPLICATIONS

This application claims the benefit under 35 USC § 119(a) of Korean Patent Application No. 10-2021-0102387, filed on Aug. 4, 2021 in the Korean Intellectual Property Office, the entire disclosure of which is incorporated herein by reference for all purposes.

BACKGROUND

1. Technical Field

The present disclosure relates to real wood skin used for automatic wrapping, and a process and apparatus for manufacturing the same.

2. Related Art

Real wood skin applied to a vehicle in the related art is made by preforming a real wood sheet on deco-veneer wood and then performing insert-injection molding (back injection).

Thereafter, trimming is performed on an end of the injection-molded real wood sheet, and then curling and coating are sequentially performed on the real wood sheet, thereby manufacturing the real wood skin.

The real wood skin product in the related art, which is made by applying the back insert-injection molding process, may provide real wood having a visually and tactilely excellent surface. However, because the real wood having high hardness is attached to the injection-molded part, the real wood provides cheeping feeling to a customer when the customer pushes the real wood.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present disclosure has been made in an effort to solve the problems in the related art, and an object of the present disclosure is to provide a real wood sheet capable of visually providing a real wood feeling and flexibility and being used for automatic wrapping.

The present disclosure has also been made in an effort to provide a real wood sheet capable of being used for automatic wrapping for wrapping a real wood pad during a process of manufacturing the real wood sheet.

The objects of the present disclosure are not limited to the aforementioned objects, and other objects, which are not mentioned above, may be clearly understood from the following descriptions.

In one general aspect, a real wood sheet capable of being used for automatic wrapping includes: a wood layer; a mesh layer disposed on a surface of the wood layer; and a flexible layer disposed on a surface of the mesh layer such that the mesh layer is disposed between the wood layer and the flexible layer.

The real wood sheet may include a protective film which is removed after a process. The protective film may be disposed on a surface of the wood layer opposite the mesh layer and protect the wood layer.

A reference thickness may be t and the wood layer may have a thickness of 0.1 t to 0.2 t.

The mesh layer may have a thickness of 0.2 t.

The flexible layer may be made of one of PP foam and TPO foam. The flexible layer may have a thickness of 1 t to 2 t.

The protective film may have a thickness of 0.1 t.

The wood layer may have a grain of wood formed by a setting machine.

The real wood sheet may include: a filament cross pad disposed on a surface of the flexible layer opposite the mesh layer and in a region of a desk of a vehicle to which a real wood layer is to be applied; and a core mounted on the desk of the vehicle.

The filament cross pad may have a thickness of 2 t to 5 t.

The filament cross pad may be one of a PP pad and a TPO pad.

The core may have a thickness of 0.3 t.

In another general aspect, a method of manufacturing a real wood sheet includes: stacking a mesh layer on a surface of a wood layer; stacking a flexible layer on a surface of the mesh layer opposite the wood layer; and stacking a protective film on surface of the wood layer opposite the mesh layer.

According to the first embodiment of the present disclosure, the real wood sheet constituting a desk of a vehicle may visually provide the same feeling as real wood.

Other features and aspects will be apparent from the following detailed description, the drawings, and the claims.

BRIEF DESCRIPTION OF THE DRAWINGS

FIG. 10 is a reference view for explaining an example in which a crash pad for a vehicle including the real wood sheet according to the embodiment of the present disclosure is installed.

DETAILED DESCRIPTION

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is completely disclosed, and a person with ordinary skill in the art can fully understand the scope of the present disclosure. The present disclosure will be defined only by the scope of the appended claims. Meanwhile, the terms used in the present specification are for explaining the embodiments, not for limiting the present disclosure. Unless particularly stated otherwise in the present specification, a singular form also includes a plural form. The terms "comprise (include)" and/or "comprising (including)" used in the specification are intended to specify the presence of the mentioned constituent elements, steps, operations, and/or elements, but do not exclude the presence or addition of one or more other constituent elements, steps, operations, and/or elements.

Figure 1:
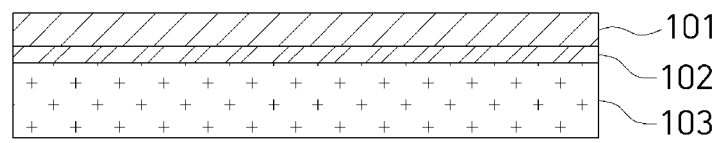
FIG. 1 is a reference view for explaining real wood skin according to the present disclosure which may be used for automatic wrapping.

FIG. 1 is a reference view for explaining real wood skin according to the present disclosure which may be used for automatic wrapping.

As illustrated in FIG. 1, real wood skin according to a first embodiment of the present disclosure, which may be used for automatic wrapping, includes a wood layer 101, a mesh layer 102, and a flexible layer 103.

The wood layer 101 is a layer that provides the same visual feeling as a wooden material. The wood layer 101 may have a thickness of 0.1 t to 0.2 t and may have a grain of wood made by a setting machine.

Further, the mesh layer 102 is a layer stacked on a lower portion of the wood layer 101 and configured to reinforce a sheet. The mesh layer 102 may have a thickness of 0.2 t.

In addition, the flexible layer 103 is a layer stacked on a lower portion of the mesh layer 102 and configured to provide flexibility. The flexible layer 103 may be made of one of polypropylene (PP) foam and thermoplastic polyolefin (TPO) foam. Further, the flexible layer 103 may have a thickness of 1 t to 2 t.

In addition, according to the first embodiment of the present disclosure, the real wood skin may further include a protective film 104 stacked on an upper portion of the wood layer 101 and configured to protect the wood layer. The protective film 104 may have a thickness of 0.1 t.

Figure 2:
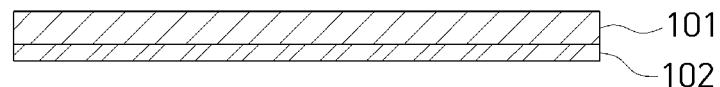
FIGS. 2, 3, 4, 5, and 6 are reference views for explaining a process of manufacturing a crash pad for a vehicle including a real wood sheet according to an embodiment of the present disclosure.
Figure 3:
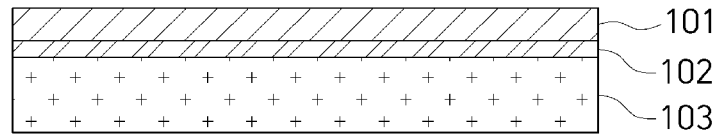
Figure 4:
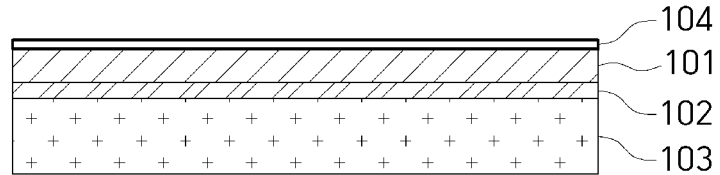

FIGS. 2 to 4 are reference views for explaining a process of manufacturing a real wood sheet according to the first embodiment of the present disclosure.

As illustrated in FIG. 2, in the real wood sheet according to the first embodiment of the present disclosure, the mesh layer 102 is stacked on a lower end of the wood layer 101. Thereafter, as illustrated in FIG. 3, the flexible layer 103 is stacked on a lower end of the mesh layer 102. Further, as illustrated in FIG. 4, the protective film 104 may be stacked on an upper end of the wood layer 101 and protect the wood layer 101.

Figure 5:
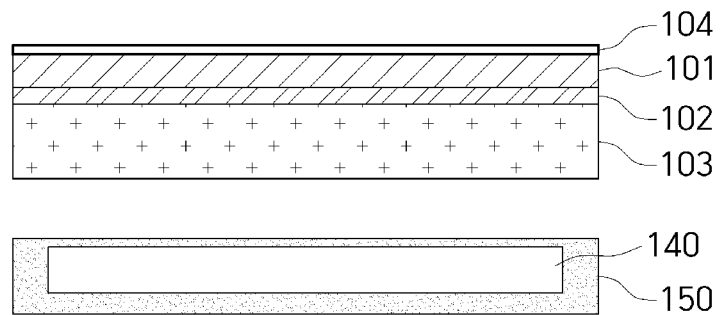
Figure 6:
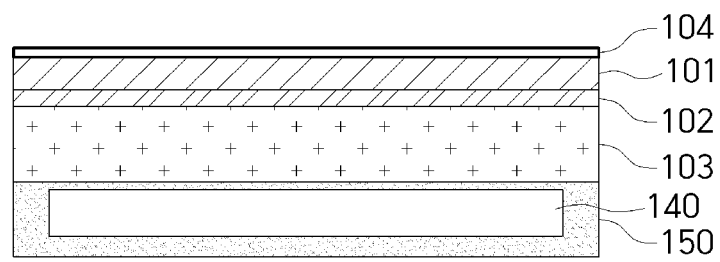

As illustrated in FIGS. 5 and 6, a real wood sheet 100 including the wood layer 101, the mesh layer 102, and the flexible layer 103 further includes a filament cross pad 140 and a core 150 disposed at a lower side thereof.

The filament cross pad 140 is provided in a partial region of a desk in order to provide cushioning to the partial region of the region of the desk of the vehicle.

Figure 7:
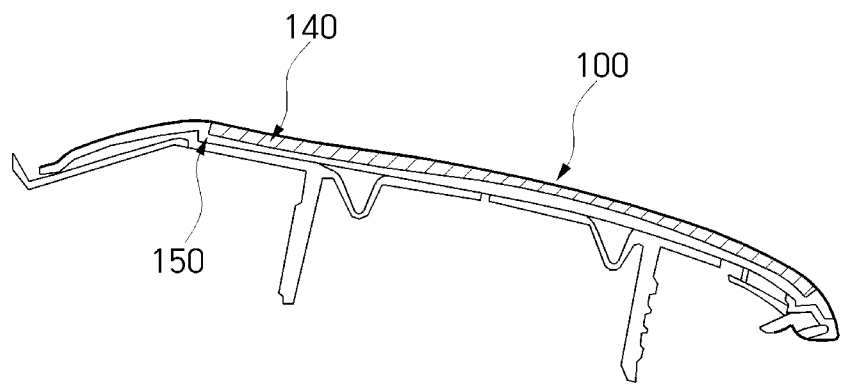
FIG. 7 is a reference view for explaining an example in which a filament cross pad is applied to the embodiment of the present disclosure.

As described above, the filament cross pad 140 provided in one region of the desk is stacked on a lower portion of the flexible layer 103. In this case, the filament cross pad 140 may have a thickness of 2 t to 5 t. In this case, as illustrated in FIG. 7, a region to which the filament cross pad 140 is applied is an entire region that the hand may reach, i.e., a region within 3 mm or less from an end of an injection-molded portion of the real wood sheet. The filament cross pad 140 may be a pad made of a material such as PP or TPO. However, the material of the filament cross pad 140 is not limited thereto.

Further, the core 150 may be mounted on the desk of the vehicle and have a thickness of 0.3 t.

Figure 8:
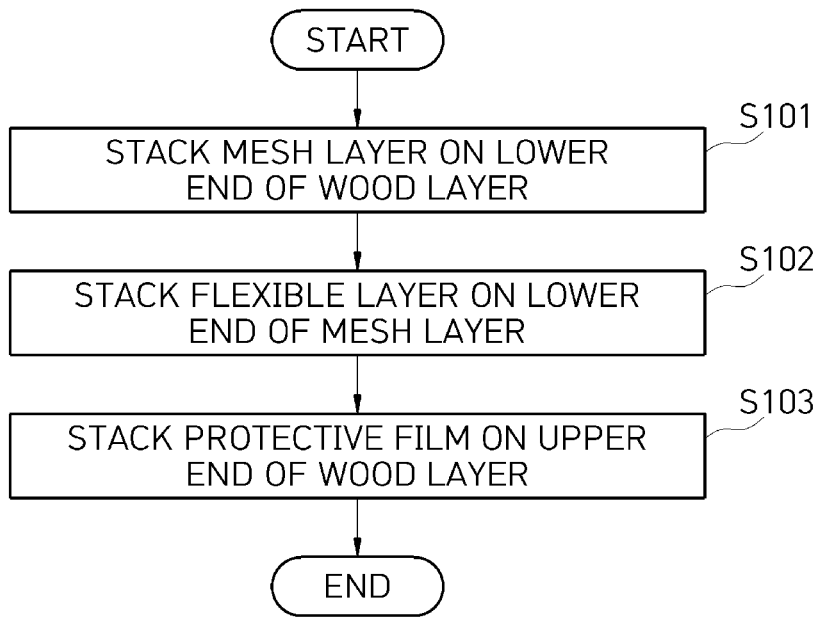
FIG. 8 is a flowchart for explaining a method of manufacturing a real wood sheet according to the embodiment of the present disclosure.

FIG. 8 is a flowchart for explaining a method of manufacturing a real wood sheet according to the embodiment of the present disclosure.

As illustrated in FIG. 8, according to the method of manufacturing a real wood sheet according to the first embodiment of the present disclosure, the mesh layer 102 is stacked first on the lower end of the wood layer 101, as illustrated in FIG. 2 (S101).

Thereafter, as illustrated in FIG. 3, the flexible layer 103 is stacked on the lower end of the corresponding mesh layer 102 (S102).

Further, as illustrated in FIG. 4, the protective film 104 may be stacked on the upper end of the wood layer 101 (S103), thereby protecting the wood layer 101.

Figure 9:
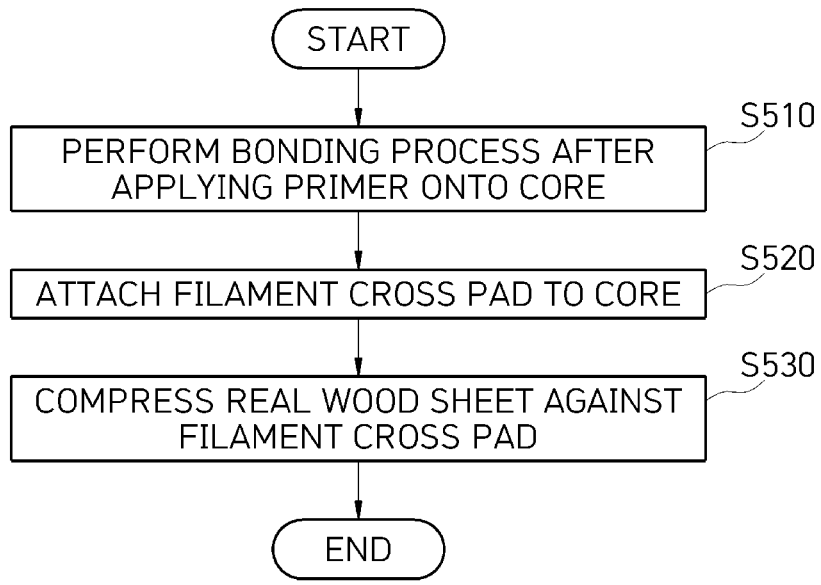
FIG. 9 is a flowchart for explaining a method of manufacturing a real wood crash pad according to the embodiment of the present disclosure.

FIG. 9 is a flowchart for explaining the method of manufacturing a real wood crash pad according to the embodiment of the present disclosure.

As illustrated in FIG. 9, a bonding process of applying primer onto the core 150 and then applying a bonding agent onto the core 150 is performed (S510). Thereafter, the filament cross pad 140 is attached to the core 150 (S520). The filament cross pad may be attached by a membrane or press compression process.

That is, after the bonding process of applying the bonding agent onto an upper portion of the filament cross pad 140 is performed, a compression jig is used to compress the real wood sheet 100 including the wood layer 101, the mesh layer 102, and the flexible layer 103 against the filament cross pad 140 (S530).

As described above, the real wood sheet 100 constituting the desk of the vehicle may provide the same visual feeling as real wood and provide a predetermined degree of cushioning when an occupant touches the real wood sheet 100, as illustrated in FIG. 10.

According to the first embodiment of the present disclosure, the PP foam/TPO foam may be applied onto a wood rear surface to increase an elongation percentage of the real wood sheet and improve quality of a surface of the real wood sheet, and the filament cross pad, which is used for natural leather or artificial leather in the related art, may be applied to the core, thereby providing a real-wood-wrapped product with softness that cannot be implemented when the real wood sheet in the related art is manufactured by injection-molding.

Each step included in the method described above may be implemented as a software module, a hardware module, or a combination thereof, which is executed by a computing device.

Also, an element for performing each step may be respectively implemented as first to two operational logics of a processor.

The software module may be provided in RAM, flash memory, ROM, erasable programmable read only memory (EPROM), electrical erasable programmable read only memory (EEPROM), a register, a hard disk, an attachable/detachable disk, or a storage medium (i.e., a memory and/or a storage) such as CD-ROM.

An exemplary storage medium may be coupled to the processor, and the processor may read out information from the storage medium and may write information in the storage medium. In other embodiments, the storage medium may be provided as one body with the processor.

The processor and the storage medium may be provided in application specific integrated circuit (ASIC). The ASIC may be provided in a user terminal. In other embodiments, the processor and the storage medium may be provided as individual components in a user terminal.

Exemplary methods according to embodiments may be expressed as a series of operation for clarity of description, but such a step does not limit a sequence in which operations are performed. Depending on the case, steps may be performed simultaneously or in different sequences.

In order to implement a method according to embodiments, a disclosed step may additionally include another step, include steps other than some steps, or include another additional step other than some steps.

Various embodiments of the present disclosure do not list all available combinations but are for describing a representative aspect of the present disclosure, and descriptions of various embodiments may be applied independently or may be applied through a combination of two or more.

Moreover, various embodiments of the present disclosure may be implemented with hardware, firmware, software, or a combination thereof. In a case where various embodiments of the present disclosure are implemented with hardware, various embodiments of the present disclosure may be implemented with one or more application specific integrated circuits (ASICs), digital signal processors (DSPs), digital signal processing devices (DSPDs), programmable logic devices (PLDs), field programmable gate arrays (FPGAs), general processors, controllers, microcontrollers, or microprocessors.

The scope of the present disclosure may include software or machine-executable instructions (for example, an operation system (OS), applications, firmware, programs, etc.), which enable operations of a method according to various embodiments to be executed in a device or a computer, and a non-transitory computer-readable medium capable of being executed in a device or a computer each storing the software or the instructions.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

While the configuration of the present disclosure has been described above in detail with reference to the accompanying drawings, the description of the configuration is for illustrative purposes only, and various modifications and alterations may of course be made by those skilled in the art without departing from the technical spirit of the present disclosure. Accordingly, the protection scope of the present disclosure should not be limited by the above-mentioned embodiments but should be determined by the appended claims.

What is claimed is:

1. A real wood sheet capable of being used for automatic wrapping, the real wood sheet comprising:
   a wood layer;
   a mesh layer disposed on a surface of the wood layer;
   a flexible layer of either polypropylene or thermoplastic polyolefin foam disposed on a surface of the mesh layer such that the mesh layer is disposed between the wood layer and the flexible layer;
   a filament cross pad disposed on a lower surface of the flexible layer opposite the mesh layer; and
   a core disposed on a lower side of the filament cross pad.

2. The real wood sheet of claim 1, wherein t is a reference thickness where the flexible layer has a thickness of 1 t, and the wood layer has a thickness of 0.1 t to 0.2 t.

3. The real wood sheet of claim 2, wherein the mesh layer has a thickness of 0.2 t.

4. The real wood sheet of claim 2, further comprising a protective film disposed on a surface of the wood layer opposite the mesh layer, wherein the protective film has a thickness of 0.1 t.

5. The real wood sheet of claim 1, wherein the wood layer comprises a grain of wood formed by a setting machine.

6. The real wood sheet of claim 1, wherein the filament cross pad is one of a PP pad and a TPO pad.

7. The real wood sheet of claim 2, wherein the core has a thickness of 0.3 t.

8. A method of manufacturing a real wood sheet, the method comprising:
   stacking a mesh layer on a surface of a wood layer;
   stacking a flexible layer of either polypropylene or thermoplastic polyolefin foam on a surface of the mesh layer opposite the wood layer;
   stacking a protective film on surface of the wood layer opposite the mesh layer;
   disposing a filament cross pad on a lower surface of the flexible layer opposite the mesh layer; and
   disposing a core on a lower side of the filament cross pad.

9. A method of manufacturing a real wood sheet, the method comprising:
   stacking a mesh layer on a surface of a wood layer;
   stacking a flexible foam layer on a surface of the mesh layer opposite the wood layer;
   stacking a protective film on surface of the wood layer opposite the mesh layer;
   stacking a filament cross pad on a lower surface of the flexible layer opposite the mesh layer; and
   stacking a core on a lower side of the filament cross pad.

* * * * *